United States Patent
McKenney et al.

(10) Patent No.: US 7,979,617 B2
(45) Date of Patent: *Jul. 12, 2011

(54) QUAD AWARE LOCKING PRIMITIVE

(75) Inventors: Paul E. McKenney, Beaverton, OR (US); Benedict Jackson, Beaverton, OR (US); Ramakrishnan Rajamony, Austin, TX (US); Ronald L. Rockhold, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 263 days.

This patent is subject to a terminal disclaimer.

(21) Appl. No.: 12/264,764

(22) Filed: Nov. 4, 2008

(65) Prior Publication Data
US 2009/0063826 A1 Mar. 5, 2009

Related U.S. Application Data

(63) Continuation of application No. 09/753,062, filed on Dec. 28, 2000, now Pat. No. 7,500,036.

(51) Int. Cl.
G06F 12/00 (2006.01)
(52) U.S. Cl. ............ 710/200; 710/240; 710/260
(58) Field of Classification Search .......... 710/200, 710/240–244, 260–269
See application file for complete search history.

(56) References Cited

U.S. PATENT DOCUMENTS

| | | |
|---|---|---|
| 4,975,833 A | 12/1990 | Jinzaki |
| 5,175,829 A | 12/1992 | Stumpf et al. |
| 5,319,780 A | 6/1994 | Catino et al. |
| 5,432,915 A | 7/1995 | Jippo |
| 5,515,516 A | 5/1996 | Fisch et al. |
| 5,596,754 A | 1/1997 | Lomet |
| 5,669,002 A | 9/1997 | Buch |
| 5,778,441 A | 7/1998 | Rhodehamel et al. |
| 5,895,492 A | 4/1999 | Greenspan et al. |
| 6,141,733 A | 10/2000 | Arimilli et al. |
| 6,163,831 A | 12/2000 | Kermani |
| 6,282,583 B1 | 8/2001 | Pincus et al. |
| 6,338,112 B1 | 1/2002 | Wipfel et al. |
| 6,389,519 B1 | 5/2002 | Thusoo et al. |
| 6,473,819 B1 | 10/2002 | Jackson et al. |

FOREIGN PATENT DOCUMENTS

HU 219992 4/1995

(Continued)

OTHER PUBLICATIONS

Magnusson et al. "Efficient Software Synchronization on Large Cache Coherent Multiprocessors", Swedish Institute of Computer Science T94:07 Feb. 18, 1994.

(Continued)

*Primary Examiner* — Mark Rinehart
*Assistant Examiner* — Kim T Huynh
(74) *Attorney, Agent, or Firm* — Lieberman & Brandsdorfer, LLC

(57) ABSTRACT

A method and computer system for efficiently handling high contention locking in a multiprocessor computer system. At least some of the processors in the system are organized into a hierarchy, and process an interruptible lock in response to the hierarchy. The method utilizes two alternative methods of acquiring the lock, including a conditional lock acquisition primitive and an unconditional lock acquisition primitive, and an unconditional lock release primitive for releasing the lock from a particular processor. To prevent races between processors requesting a lock acquisition and a processor releasing the lock, a release flag is utilized. Furthermore, in order to ensure that the a processor utilizing the unconditional lock acquisition primitive is granted the lock, a handoff flag is utilized.

20 Claims, 11 Drawing Sheets

FOREIGN PATENT DOCUMENTS

| | | |
|---|---|---|
| JP | 02-129742 | 5/1990 |
| JP | 03-245257 | 10/1991 |
| JP | 05-225149 | 9/1993 |
| JP | 05-257902 | 10/1993 |
| JP | 09-212472 | 8/1997 |
| JP | 10-161985 | 6/1998 |
| JP | 02-170259 | 10/1999 |
| JP | 11-282815 | 10/1999 |
| JP | 2001-095350 | 4/2001 |
| JP | 2001-108290 | 4/2001 |

OTHER PUBLICATIONS

Seung-Ju et al., "Spin-Block Synchronization Algorithm in the Shared Memory Multiprocessor System", Operating Systems Review, Oct. 1994, pp. 15-30.

Wisniewski et al. "Scalable Spin Locks for Multiprogrammed Systems", Eighth IEEE International Parallel Processing Symposium, 1994.

Craig, "Building FIFO and Priority-Queuing Spin Locks from Atomic Swap", Department of Computer Science and Engineering, FR-35, University of Washington, Feb. 1, 1993.

Lim et al., Transactions on Computer Systems "Waiting Algorithms for Synchronization in Large-Scale Multiprocessors", pp. 253-294, Aug. 1993.

Mellor-Crummey, "Algorithms for Scalable Synchronization on Shared-Memory Multiprocessors", ACM Transactions on Computer Systems, vol. 9, No. 1, pp. 21-65, Feb. 1991.

Finkel, R.A., "An Operating Systems Vade Mecum, Concurrency," Operating Systems Vade Mecum, 1989, pp. 274-313.

QUAD AWARE LOCKING PRIMITIVE

CROSS REFERENCE TO RELATED APPLICATION(S)

This application is a continuation of application Ser. No. 09/753,062, filed on Dec. 28, 2000, now pending, which is hereby incorporated herein by reference.

BACKGROUND OF THE INVENTION

1. Technical Field

This invention relates to a method and system for efficiently handling high contention locking in a multiprocessor. More specifically, the processors of the system are organized in a hierarchical manner, wherein granting of an interruptible lock to a processor is based upon the hierarchy.

2. Description of the Prior Art

Multiprocessor systems by definition contain multiple processors, also referred to herein as CPUs, that can execute multiple processes or multiple threads within a single process simultaneously, in a manner known as parallel computing. In general, multiprocessor systems execute multiple processes or threads faster than conventional uniprocessor systems that can execute programs sequentially. The actual performance advantage is a function of a number of factors, including the degree to which parts of a multithreaded process and/or multiple distinct processes can be executed in parallel and the architecture of the particular multiprocessor system at hand. The degree to which processes can be executed in parallel depends, in part, on the extent to which they compete for exclusive access to shared memory resources.

The architecture of shared memory multiprocessor systems may be classified by how their memory is physically organized. In distributed shared memory (DSM) machines, the memory is divided into modules physically placed near one or more processors, typically on a processor node. Although all of the memory modules are globally accessible, a processor can access local memory on its node faster than remote memory on other nodes. Because the memory access time differs based on memory location, such systems are also called non-uniform memory access (NUMA) machines. On the other hand, in centralized shared memory machines the memory is physically in one location. Centralized shared memory computers are called uniform memory access (UMA) machines because the memory is equidistant in time for each of the processors. Both forms of memory organization typically use high-speed caches in conjunction with main memory to reduce execution time.

The use of NUMA architecture to increase performance is not restricted to NUMA machines. A subset of processors in an UMA machine may share a cache. In such an arrangement, even though the memory is equidistant from all processors, data can circulate among the cache-sharing processors faster, i.e. with lower latency, than among the other processors in the machine. Algorithms that enhance the performance of NUMA machines can thus be applied to any multiprocessor system that has a subset of processors with lower latencies. These include not only the noted NUMA and shared-cache machines, but also machines where multiple processors share a set of bus-interface logic as well as machines with interconnects that "fan out" (typically in hierarchical fashion) to the processors.

A significant issue in the design of multiprocessor systems is process synchronization. The degree to which processes can be executed in parallel depends in part on the extent to which they compete for exclusive access to shared memory resources. For example, if two processes A and B are executing in parallel, process B might have to wait for process A to increment a count before process B can access it. Otherwise, a race condition could occur where process B might access the buffer before process A had a chance to increment it. To avoid conflicts, process synchronization mechanisms are provided to control the order of process execution. These mechanisms include mutual exclusion locks, condition variables, counting semaphores, and reader-writer locks. A mutual exclusion lock allows only the processor holding the lock to execute an associated action. When a processor requests a mutual exclusion lock, it is granted to that processor exclusively. Other processors desiring the lock must wait until the processor with the lock releases it.

Operating system kernels require efficient locking primitives to enforce serialization. Spin locks an queue locks are two common serialization mechanisms. In addition to scalability and efficiency, interruptability and fairness are desired traits. Because of atomicity requirements, a thread may have to raise its priority level before entering a critical section that manipulates memory. Additionally, enabling the thread to be interrupted while it is waiting for the lock increases the responsiveness of the system to interrupts.

A spin lock is a simple construct that uses the cache coherence mechanism in a multiprocessor system to control access to a critical section. A typical spin lock implementation has two phases. In the spin phase, the waiting computation agents, for example, threads, spin on a cached copy of a single global lock variable. In the compete phase, the waiting computation agents all try to atomically modify the lock variable from the available to the held state. The one computation agent that succeeds in this phase has control of the lock; the others go back to the spin phase. The transition from the spin to the compete phase is initiated when the lock holder releases the lock by marking the lock variable as available.

Spin locks have two main advantages: they require only a few instructions to implement and they are easily designed to be interruptible. The main disadvantage of spin locks is that they do not scale well. The compete phase can cause significant contention on the system buses when a large number of computation agents simultaneously attempt to acquire the lock. Spin locks are thus suitable only for lightly contended locks. In addition, since the lock is not necessarily granted in the first in first out (FIFO) order, spin locks are typically not fair Accordingly, there is a need for a computer system comprising multiple processors and a method of producing high-performance parallel programs to maintain high degrees of memory locality for the locking primitive and for the data manipulated within the critical sections. Although partitioning increases locality, there is a need for a locking primitive that promotes critical-section data locality without redesign. The novel locking algorithms presented herein promote critical section data locality while producing significant system-level performance benefits.

SUMMARY OF THE INVENTION

It is therefore an object of the invention to provide an interruptible lock and a method of granting a lock to a processor in a multiprocessor computer system. It is a further object of the invention to organize the processors in a hierarchical manner and to grant the lock to a subsequent processor based upon its position in the hierarchy.

In one aspect of the invention, a multiprocessor computer system is provided to accommodate lock acquisition in a high contention locking atmosphere. The system includes a hierarchical representation of processor organization, together with an interruptible lock, or a lock which waits using only local memory. In addition, the system includes a lock primitive for processing the lock responsive to the hierarchy. The primitive includes a handoff flag to grant a lock to a processor requesting an unconditional lock from a processor requesting a conditional lock.

In another aspect of the invention, In one aspect of the invention, a multiprocessor computer system is provided to accommodate lock acquisition in a high contention locking atmosphere. The system includes a hierarchical representation of processor organization, together with an interruptible lock, or a lock which waits using only local memory. In addition, the system includes a lock primitive for processing the lock responsive to the hierarchy. The primitive includes a release flag to prevent races between acquisition and release of the lock.

In yet another aspect of the invention, an article is provided with a computer-readable signal bearing medium, with multiple processors operating in the medium. The article includes a primitive for processing the lock, wherein the primitive is responsive to the hierarchical organization of at least some of the processors. The lock is either an interruptible lock, or a lock which waits using only local memory. In addition, a release flag is provided responsive to races between a lock acquisition and a lock release.

In an even further aspect of the invention, an article is provided with a computer-readable signal bearing medium, with multiple processors operating in the medium. The article includes a primitive for processing the lock, wherein the primitive is responsive to the hierarchical organization of at least some of the processors. The lock is either an interruptible lock, or a lock which waits using only local memory. In addition, a handoff flag is provided responsive to a processor requesting an unconditional lock from a processor requesting a conditional lock.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

The kernel round robin locking primitive (krlock) of this invention is a straight spinlock designed to handle a large quantity of CPUs grouped into nodes, and wherein the nodes are preferably quads having up to four processors. krlock is intended to efficiently handle high contention locking situations on architectures with various ratios of latency between local and remote memory. Efficient operation at low latency ratios requires that the locking primitives minimize local bus as well as remote memory operations.

Memory latency can be a significant factor in well constructed parallel programs. Performance may be estimated by tracking the flow of data among CPU's, caches, and memory. For SMP (symmetric multi-processor) and CC-NUMA (cache coherent non-uniform memory access) architectures, this data flow is controlled by the cache coherent protocol, which moves the data in units of cache lines.

Figure 9:
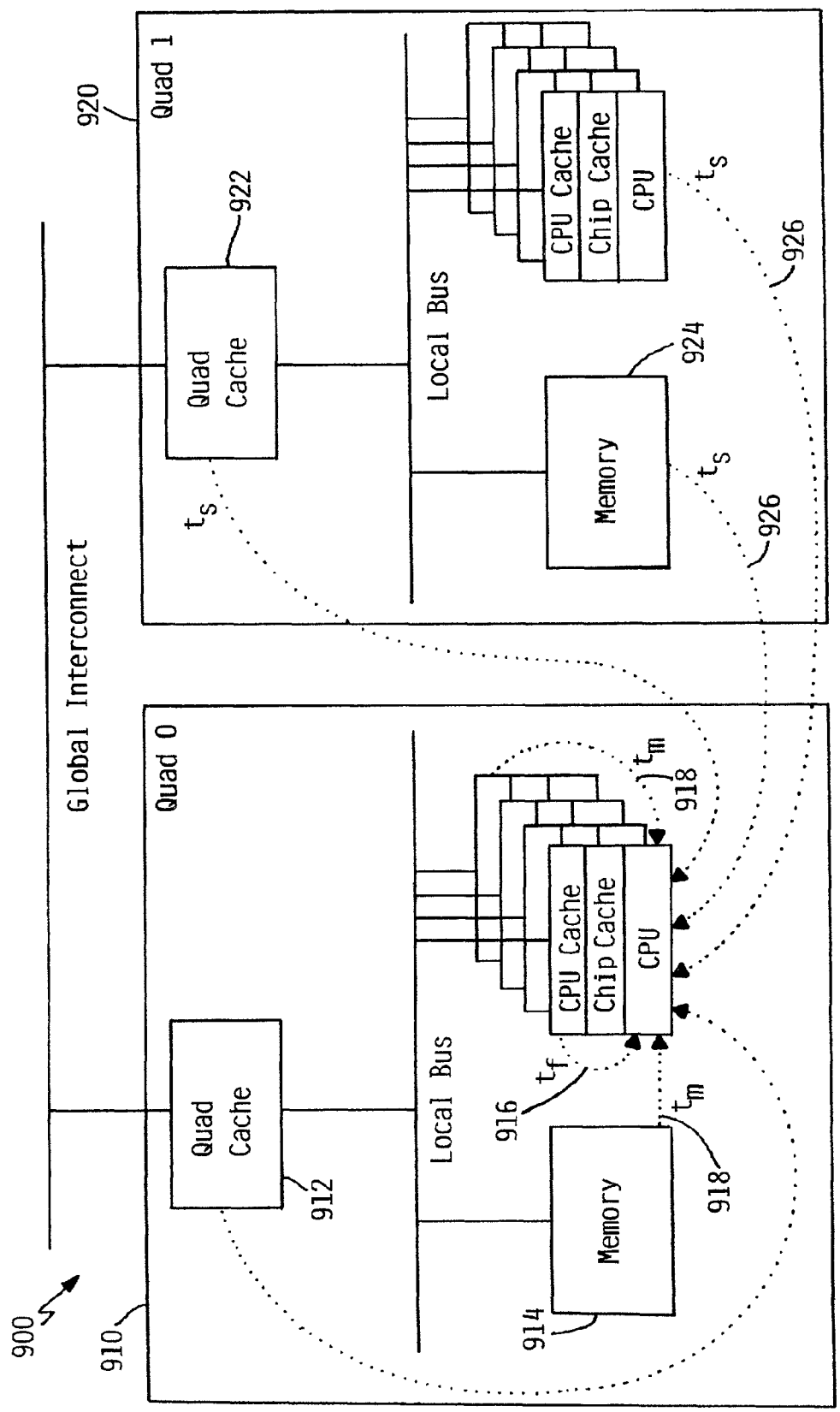
FIG. 9 is a block diagram of a multiprocessor computer system illustrating memory latency.

As shown in FIG. 9, a CC-NUMA system (900) is composed of modules of quads (910), (920) containing both CPUs (912), (922) and memory (914), (924). Data residing closer to a given CPU will have shorter access latencies. Data that is already in a given CPU's cache may be accessed with latency $t_f$ (916). Data located elsewhere on the same quad may be accessed with latency $t_m$ (918), while data located on other quads may be accessed with latency $t_s$ (926). Once a given data time has been accessed by a CPU, it is cached in that CPU's cache. If the data's home is in some other quad's memory, then it will also be cached in the accessing CPU's quad's cache. The caching allows subsequent accesses from the same CPU to proceed with much lower latency. Data that has been previously accessed by a given CPU is assumed to reside in that CPU's cache, with access latency tf(916). Accordingly, the latency of accessing data and resources is dependent upon the location of the resource with respect to the accessing CPU.

The kernel round robin locking primitive is designed to operate fairly and efficiently on a CC-NUMA machine under heavy contention, i.e. when there is at least one CPU waiting for the lock any time some other CPU releases the lock. The primitive is designed to pass a lock on an intra-quad basis when appropriate, while preventing any quad from monopolizing the lock for an extended period of time. Any monopolization of the lock by any particular quad may cause "starvation" to other quads on the system, i.e. preventing other quads from accessing the lock. As such, the kernel round robin locking primitive is designed to pass locks on an interquad basis in a fair and equitable manner. If one quad has CPU's spinning on a lock, then that quad may not acquire more than two consecutive lock acquisition episodes before any waiting quad is granted a lock acquisition. This allows for some degree of fairness to lock acquisitions among the quads. Furthermore, an interquad handoff of a lock must be accomplished in a minimal number of remote-memory transactions when operating under a heavy load. In order to raise efficiency, locks must be handed off to CPUs on the same quad as the current lock holder if there are CPU's waiting for the lock and if the maximum quantity of consecutive locks for the quad has not been exceeded. Handing off of a lock to another CPU on the same quad maintains efficiency since the physical time differential for such a handoff is smaller than that to a CPU in another quad. Intra quad handoff also increases critical section data locality. Finally, in order to maintain efficiency, lock handoff must be accomplished with low local bus contention and with a small number of instructions. This allows efficient operation at low memory latency ratios. Accordingly, the rules outlined above provide for efficient usage of locks within a kernel of an operating system.

One of the primary characteristics of the krlock is the accommodation of system interrupts. A CPU may not acquire a lock if the CPU experiences a system interrupt. There are two methods of acquiring a lock. The first method is to conditionally acquire a lock (cp_krlock) while simultaneously raising system priority levels ("SPL") to exclude interrupts. This method returns a failure to acquire the lock if the lock is not immediately available. A second method is to unconditionally acquire the lock (p_krlock) while simultaneously raising the SPL. In an unconditional lock acquisition, a CPU may spin on the lock until the lock is available. Alternatively, SPL can be separately managed, or can even not be raised at all. Interrupts must be allowed while spinning on a lock. In addition, the lock acquisition methods must properly handle lock acquisitions from interrupt handlers, even to the same lock that was being spun on in the interrupt. CPUs spinning and waiting for a lock must be able to spin entirely within their own cache with no remote accesses until the lock is made available to them. Spinning CPUs cannot cause traffic on the local bus. In addition, to the lock acquisition methods, the primitive also includes a method of unconditionally releasing a lock on a CPU (v_krlock) while simultaneously lowering SPL.

Data Structures

Figure 1:
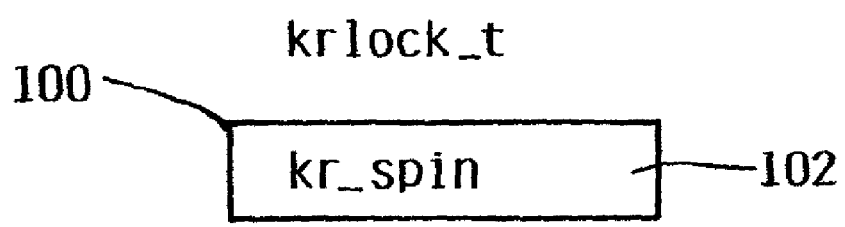
FIG. 1 shows the krlock_t data structure of the preferred embodiment of this invention.
Figure 2:
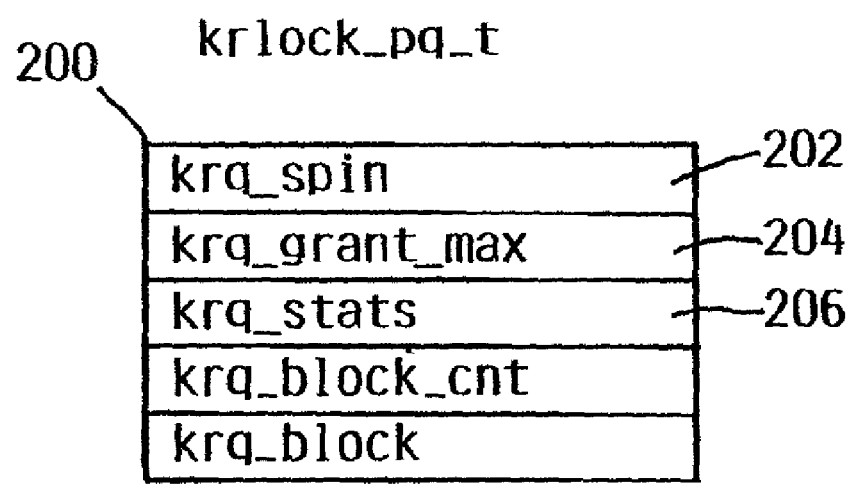
FIG. 2 shows the krlock_pq_t data structure of the preferred embodiment of this invention.

The kernel round robin locking primitive includes four types of data structures. FIG. 1 shows the first of these data structures—a global bitmask (krlock_t) (100) that contains a single bitmask (kr_spin) (102) with one bit per quad, with each per-quad bit indicating whether there is at least one CPU on that quad requesting the lock. Any CPU that sets the first bit in the global bitmask (kr_spin) (102) owns the lock and is responsible for handing the lock to a CPU requesting the lock, if there is any, upon release.

The second data structure is the per quad bitmask (krlock_pq_t) (200) that contains the spin state (krq_spin) (202), the maximum consecutive number of on-quad grants (krq_grant_max) (204), and an optional pointer to a statistics data structure (krq_stats) (206), that is used for lock profiling. If the bitfield of the maximum number of consecutive on-quad grants exceeds the maximum number of consecutive locks permitted, and if there is another CPU on another quad requesting the lock, the lock is then handed off to another quad. Once an attempt has been made to hand the lock off to a CPU on some other quad, this counter is reset. Accordingly, the global bitmask (krlock_t) (100) functions to indicate which quads have processors waiting for or holding a lock, the quad bitmask (krlock_pq_t) (200) functions to indicate which processors of a quad are waiting for the lock.

Figure 3:
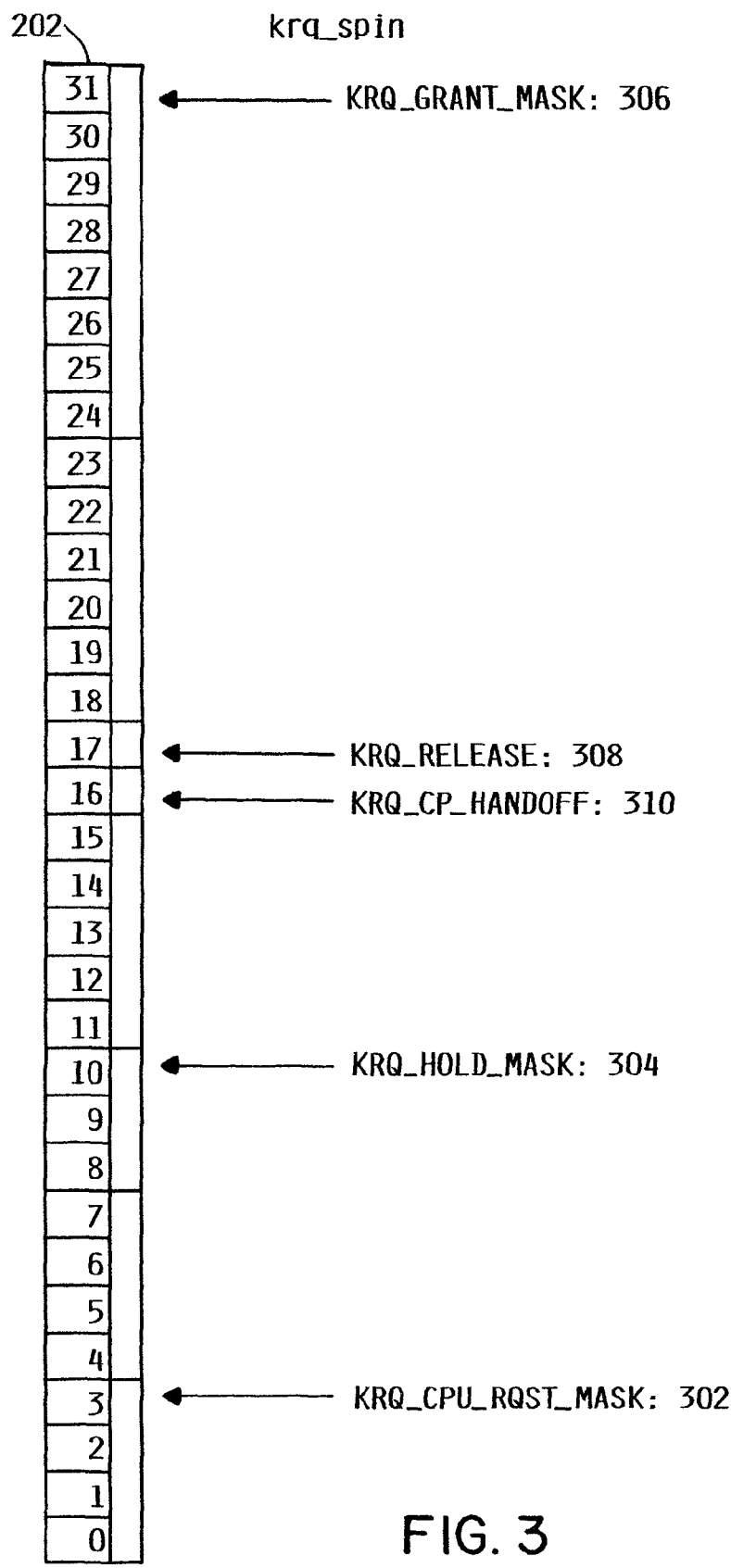
FIG. 3 shows the krq_spin data structure of the preferred embodiment of this invention.

FIG. 3 shows the spin state field (krq_spin) (202) of the per quad data structure is a mask of per-quad states that is split into multiple fields including a request field (302), a hold field (304), a grant field (306), a release field (308), and a handoff field (310). The request field (krp_cpu_rqst) (302) contains one bit for each CPU on the quad indicating whether that CPU is requesting the lock. The hold field (krq_cpu_hold) (304) contains an index indicating which CPU currently holds the lock. The grant field (krq_grant) (306) contains a count of the number of consecutive grants of the lock that have been provided to CPUs within the same quad. All of these fields must be manipulated atomically. In addition to the global bitmask (kr_spin) (102) and the per quad data structure (krlock_pq_t) (200), the kernel round robin locking primitive may optionally include a per quad statistics data structure and a per CPU table for recording the global bitmask data structure that is being spun on by the corresponding CPU. The per CPU table is designed to accommodate one entry per possible interrupt nesting level and is used to avoid handing off a lock to an interrupted spin when there is some other CPU that could make use of the lock. Accordingly, the per quad data structure is designed to control usage of the lock on a quad basis, and to ensure that a lock is not monopolized by anyone quad for an extended period of time.

The spin state bit (krq_spin) (202) of the per quad data structure contains release and handoff fields (308), (310) to effectively transfer a lock between processors. The release field (308) is a flag for preventing races for acquiring a lock that may occur between a lock acquisition and a lock release. This flag identifies that a full lock release is in progress. The handoff field (310) is a flag for indicating grant of a lock to a processor requesting the lock through the unconditional lock acquisition method and for indicating grant of a lock when a final release races with subsequent acquisitions. This flag indicates that a processor requested a conditional lock failed and the lock was transferred to a processor requesting an unconditional lock. Accordingly, both the release and handoff flags (308), (310) function to prevent miscommunication between processor that can occur with respect to lock acquisitions.

Figure 4:
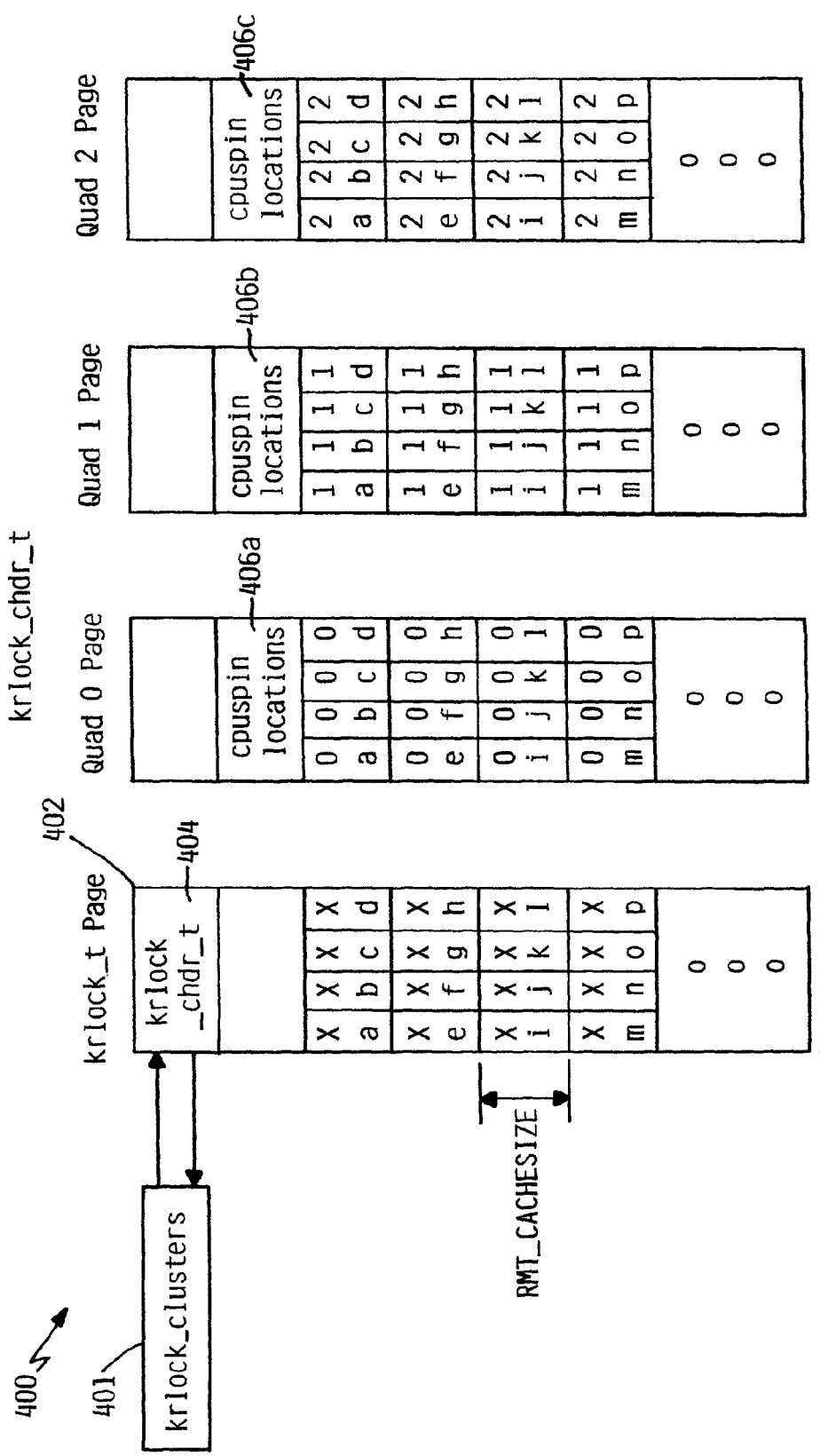
FIG. 4 shows the krlock_chdr_t data structure of the preferred embodiment of this invention.
Figure 5A:
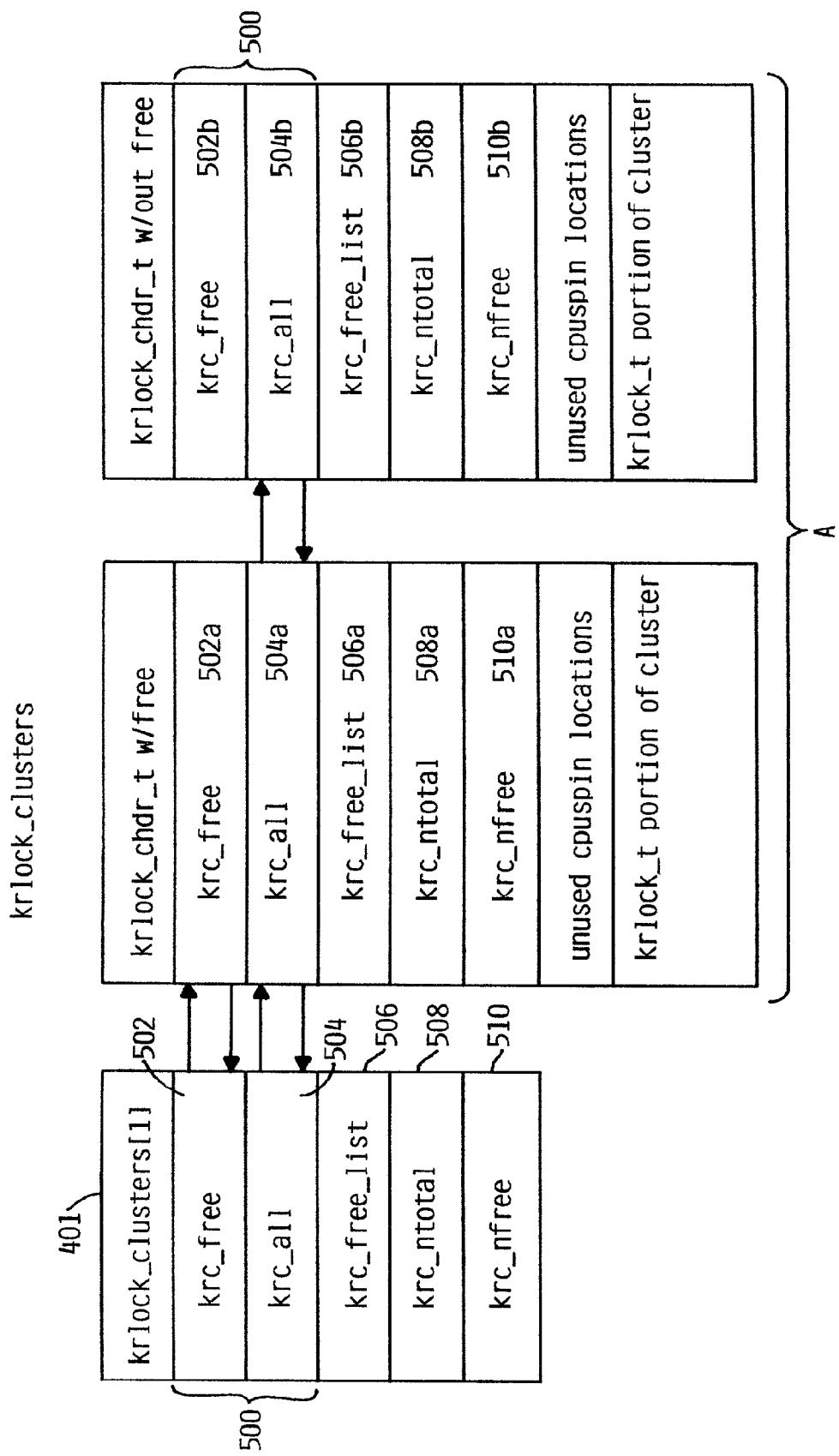
FIGS. 5A and 5B show the krlock_clusters data structure of the preferred embodiment of this invention.
Figure 5B:
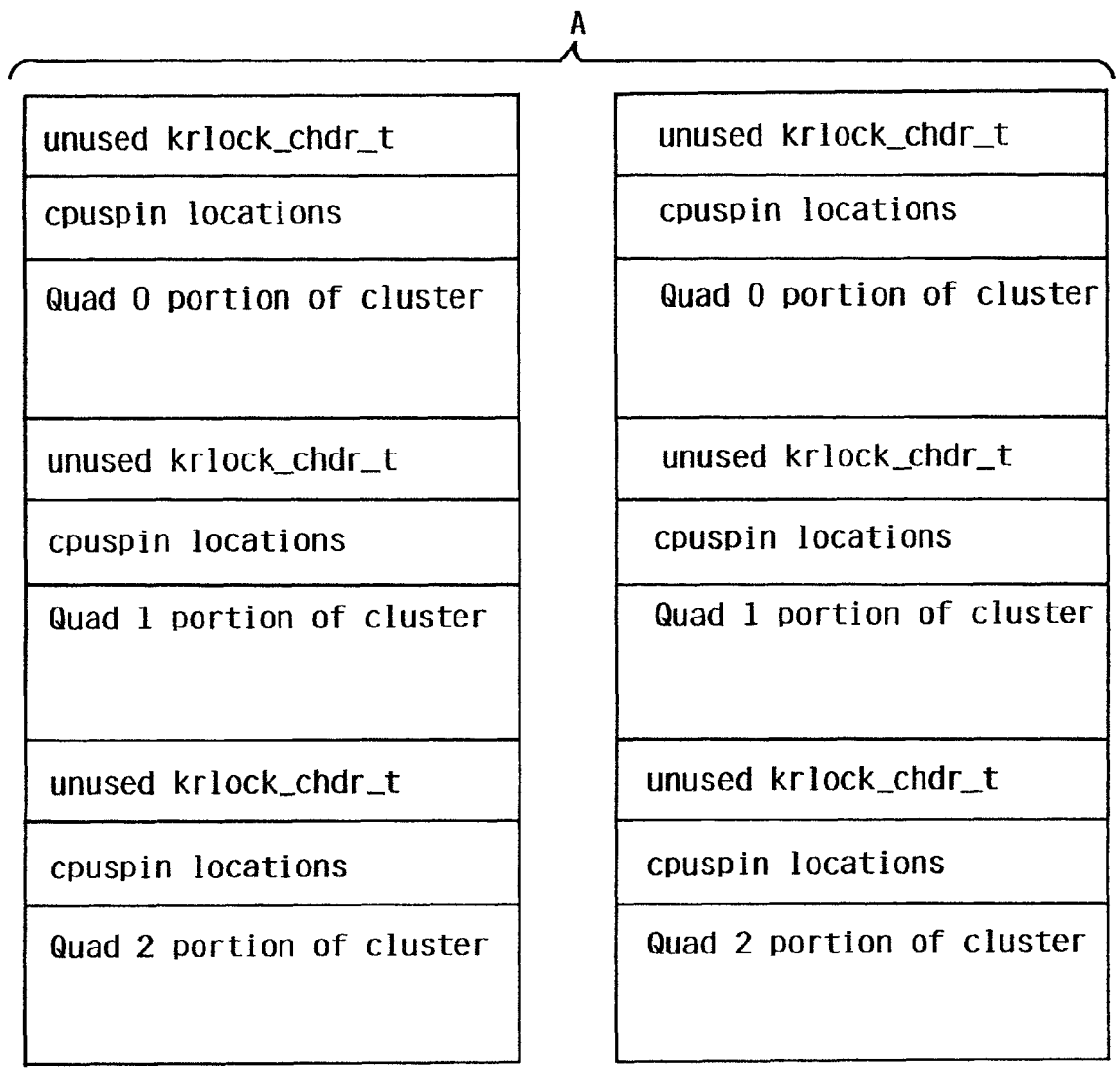

Interlacing allows high speed access to a compact set of per-quad bitmasks, which are a type krlock_pq_t, while satisfying cache alignments requirements. As shown in FIG. 4, these structures are grouped into "cluster sets" (400) made up of one page per quad, preceded by an additional page for the krlock_t structures. Each cluster set (400) is laid out in memory as follows.

The krlock_clusters structure (401) handles a free list of interlaced bitmasks. The pages of bitmasks are laid out in a contagious virtual memory. The first remote (64-byte, or RMT_CACHESIZE) cache line of the krlock_t_page (402) is occupied by a krlock_chdr_t (404). The first 64 bytes of each of the per-quad pages are unused. The next few local (32-byte) cache lines (406) of each per-quad page are used for local spinning by the CPUs with one cache line reserved for each CPU on the quad. The corresponding section of the krlock_t page is unused.

Each of the rest of the cache lines is divided into the bitmasks for a given CPU group's part of eight interlaced counter sets. Thus, "Xa" is the krlock_t for lock "a" and "0a", "1a", and "2a" are the krlock_pq_t bitmasks for lock "a". Similarly "Xb", "0b", "1b", and "2b" are the bitmasks making up lock "b".

There is a freelist (500) that threads through the krlock_t bitmasks of the cluster set of interlaced counters. Cluster sets (400) with at least one free set of interlaced bitmasks are on the doubly-linked circular list headed by the krc_free field (502) of the krlock_clusters structure (401). All cluster sets (400), whether they have free sets of interlaced counters or not, are on the doubly-linked circular list headed by krc_all field (504) of the corresponding element of the krlock_clusters array.

The structure of the freelist allows the code to start with a pointer to a krlock_t (100), and a index to the current quad's krlock_pq_t (200) without having to touch any possibly-remote memory. This preserves reasonable performance even in cases where the remote cache is being thrashed.

The fields of an krlock_chdr_t are as follows. krc_free (502) is the list of krlock cluster headers of a given shift value with at least one free set of interlaced counters. krc_all (504) is the list of all krlock cluster headers of a given shift value. krc_free_list (506) is the list of free sets of interlaced bitmasks within a given cluster, and is a pointer to the krlock_t (100). Each krlock_t (100) of the next interlaced counter sets on the freelists (500) contains a pointer to the krlock_t (100) of the next interlaced bitmask set on the freelist. The krlock_t (100) of the last interlaced bitmask set on the freelist contains a NULL pointer. This field has no meaning for the krlock_clusters structure (401). krc_ntotal (508) is the number of sets, free or otherwise, of interlaced bitmasks within a given cluster. This field, too, has no meaning for the krlock_clusters (401). krc_nfree (510) is the number of free sets of interlaced bitmasks within a given cluster. Again, this field has no meaning for the krlock_clusters structure (401).

Lock Functions

There are two different modes for acquiring the lock within the kernel round robin locking primitive, they include a method to unconditionally acquire the lock (p_krlock) and a method to conditionally acquire the lock (cp_krlock). In addition, there is one mode for releasing the lock (v_krlock). The unconditional lock acquisition mode (p_krlock) is a normal operating mode within the primitive, in which a CPU will acquire a lock or it will spin on a lock as long as necessary until it acquires the lock. The conditional lock acquisition mode (cp_krlock) is a mode of acquiring a lock under specified conditions. Each of these modes of operation are discussed below and illustrated in the accompanying drawing figures.

Figure 6A:
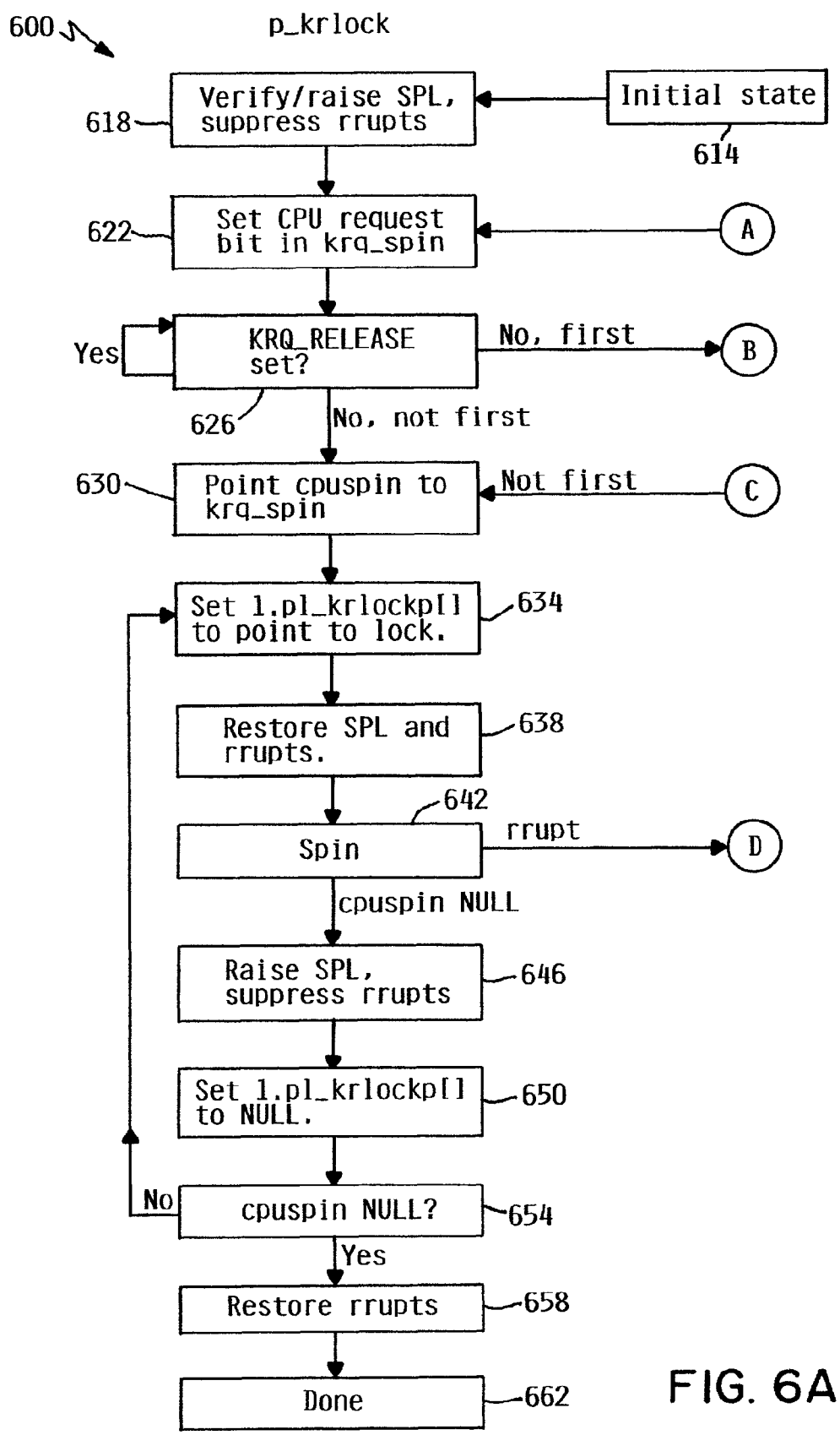
FIGS. 6A and 6B are a flow chart of an unconditional lock acquisition mode according to the preferred embodiment of this invention, and is suggested for printing on the first page of the issued patent.
Figure 6B:
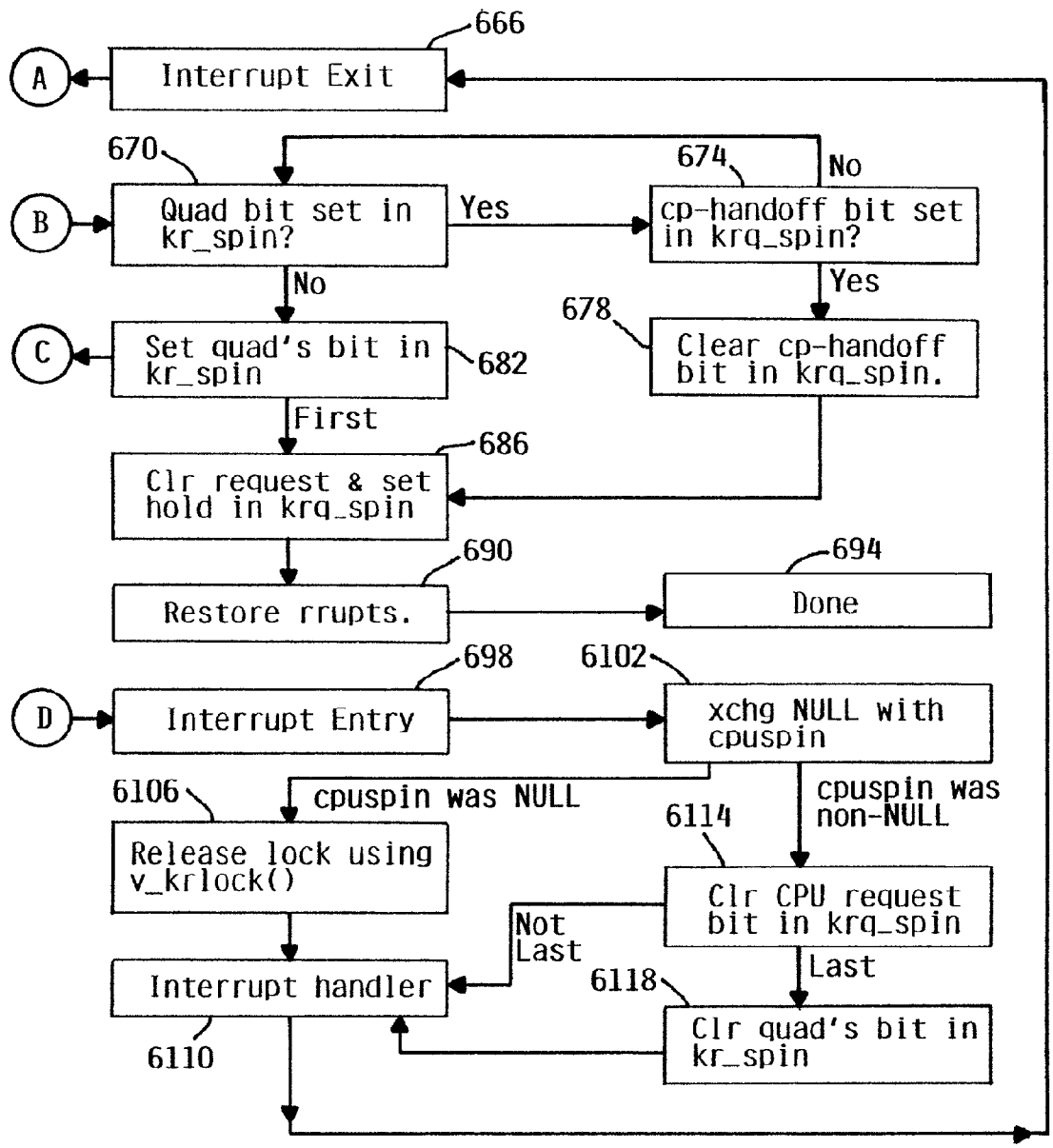

FIG. 6 refers to a flow diagram (600) of the unconditional lock acquisition mode (p_krlock) of the kernel round robin locking primitive. This mode provides for a CPU to unconditionally acquire and/or spin on a lock. The flow diagram (600) illustrates the general flow of control throughout the operation. Following the initial state (614), the CPU caller requests the lock and the system priority levels is raised, i.e. a bit is set to prevent certain interrupts from being accepted. The priority level allows the system interrupts under a certain level. The CPU request bit for the lock is then set in the spin state (krq_spin) (622), indicating that this CPU in this quad is requesting the lock. Following step (622), the release flag in the spin state field must be cleared (626). The release flag functions to prevent races between a lock release and a lock acquisition. Next, the value of the spin state field is atomically exchanged with the value in the cpuspin field (630). Each CPU has a cpuspin field (406), which points to the private location on that CPU's quad on which the CPU spins. As such, the CPU must indicate when the lock is being spun on. The entry in the per-CPU table, 1.pl_krlock, that corresponds to this CPU's current interrupt nesting level is set to point to the lock (634). This step indicates the interrupt nesting level for the CPU. Since the CPU is spinning on the lock, i.e. waiting for the lock, it is safe to allow system interrupts to the CPU. As such, the SPL and interrupts are restored (638). Accordingly, a lock was not immediately available and the CPU has been positioned to spin (642) on the lock while allowing a certain level of system interrupts so as to prevent excessive interrupt latency.

During the spin period (642), the CPU may continue to spin on the lock, be interrupted from the spinning, or receive the lock. If the CPU receives the lock, the CPU request bit for the lock is cleared, i.e. the cpuspin field becomes NULL, the SPL is raised, and the system interrupts are suppressed (646). The raising of the SPL and suppression of system interrupts allows the CPU to hold the lock. Next, the CPU table in the spin state, 1.pl_krlock, is set to NULL (650), indicative that the CPU is not spinning on the lock.

Following the modification of the CPU table in the spin state mask, it must be determined if the cpuspin field is NULL (654). If the cpuspin field is not NULL, the system interrupts are restored (658), and the lock acquisition process is completed (662). However, if the cpuspin field at (654) is NULL, this is indicative that the CPU was affected by a system interrupt and had to give up the lock. The algorithm returns to (634) to reset the CPU table in the spin state mask in order to restore lock acquisition.

If during the spin (642), the CPU is subject to a system interrupt (698), an atomic operation takes the value NULL, and exchanges it with the value in the cpuspin field (6102). However, if the cpuspin field was NULL (it is indicative that the CPU was handed the lock but cannot use it due to the system interrupt), the lock is released using the unconditional lock release procedure (v_krlock) (6106). The CPU may then invoke the interrupt handler (6110). Upon exiting the system interrupt handler (666), the CPU may return to (622) to set the lock request bit. However, if at (6102) it is determined that the cpuspin field was non-NULL, then the CPU lock request bit is cleared (6114) to cease spinning on the lock by the CPU. In addition, the quad request bit may also have to be cleared (6118). The CPU then is interrupted by the interrupt handler (6110). Upon exiting the system interrupt handler (666), the CPU may return (622) to set the lock request bit.

At (626), if the kr_spin field was zero on entry to (622), then it must be determined if the quad lock request bit by the CPU in the global bitmask has been set (670). If the quad bit is not set, the CPU must set the quad bit (682) in the global bitmask, and return to (630). However, if the quad bit in the global bitmask is set, then it must be determined if the handoff flag in the spin state bit in the per quad data structure (krq_spin) is set (674). If the handoff flag is set at (674), then the handoff flag must be cleared (678) and the lock request is cleared from the spin state in the per quad data structure (krq_spin) (686). If at (674) it is determined that the handoff flag is not set, then the procedure returns to (670) to ascertain if the quad bit is set in the global bitmask (kr_spin).

The pseudo-code for the method (p_krlock) of unconditionally acquiring the lock is as follows:

1. Raise the SPL to "s", saving the old SPL in local variable "oldspl".
2. Suppress interrupts.
3. Invoke p_krlock_nocontend. (This function acquires the specified lock if there is no contention. If there is no contention, it returns TRUE. If there is contention, it sets the CPU's and the quad's request bits as appropriate and returns FALSE). If this returns TRUE, we have the lock, and execute the following steps:
   a) Restore interrupts.
   b) Return "oldspl". Do not execute the following steps.
4. Otherwise, we must spin waiting for the lock, and set cpuspin to point to this CPU's spin area.
5. Repeat the following steps indefinitely:
   a) Atomically exchange the value of pointer to the per-quad structure ("kqp") with the value pointed to by "cpuspin", discarding the result.
   b) Set the per-CPU table 1.pl_krlock order to indicate to the interrupt entry and exit functions that we are spinning on the lock.
   c) Restore interrupts.
   d) Restore SPL to "oldspl".
   e) Spin until "cpuspin" points to NULL.
   f) Raise SPL to "s".
   g) Suppress interrupts.
   h) Set the per-CPU table 1.pl_krlockp to NULL.
   I) If "cpuspin" still points to a NULL value, we were not interrupted. Do the following:

I) Restore interrupts.
ii) Return "oldspl". Stop repeating.

The p_krlock function calls the function (p_krlock_nocontend) to acquire the lock if there is no contention. "kp" is a pointer to the krlock_t (100). Pseudo-code for p_krlock_nocontend is as follows 1) Set "oldspin" to the old value from an atomic addition to kqp->kqp_spin of a mask with this CPU's bit set and all others clear.
2) Loop until the KRQ_RELEASE bit is cleared from kqp_krq_spin. (Normally, this bit will be already cleared, so that the loop will not be executed.)
3) If "oldspin" has either CPU request or hold bits set, then there is contention. Return FALSE, and do not execute the following steps.
4) Otherwise, set "oldspin" to the current value of kp->kr_spin. It may be desirable to invalidate the other CPUs' copies of the cache line.
5) Repeat the follow steps indefinitely. Normally, we will only go through this loop once. However, races with other CPU's can provoke compare-and-exchange failures, which can force additional trips through the loop.
   a) If this quad's bit is not set in "oldspin", do the following steps to attempt to set this quad's bit:
      i) Atomically compare-and-exchange kp->kr_spin with "oldspin", substituting oldspin|quadmask on success, where "quadmask" is a mask with this quad's bit set all others clear. If this is successful, do the following:
         (1) If "oldspin" is not equal to zero, there is no contention. Return FALSE, and do not execute the following steps.
         (2) Atomically add KRQ_GRANT_INC+KRQ_ME2HOLDMASK( )-cpumask to kqp->krq_spin. This operation masks the current CPU as holding the lock and counts the grant of the lock. KRQ_GRANT_INC is a value which adds one to the KRQ_GRANT_MASK field of krq_spin 202. KRQ_ME2HOLDMASK is a macro which creates the value indicating that the CPU holds the lock.
         (3) Return TRUE and do not execute the following steps.
   b) Otherwise, this quad's bit is already set in "oldspin". This may be due to a failing cp_krlock( ), or a racing v_krlock( ) or interrupt entry. In any case do the following steps:
      i) Set "oldspinq" to kqp->kr_spin. Again, it may be desirable to invalidate the other CPU's caches.
      ii) If "oldspinq" had the KRQ_CP_HANDOFF bit set, we raced with a failing cp_krlock( ), and it awarded us the lock. Claim the lock as follows:
         (1) Atomically add the quantity (KRQ_GRANT_INC+KRQ_ME2HOLDMASK( )-cpumask-KRQ_CP_HANDOFF) to kqp->krq_spin. This atomically sets this CPU's hold value, clears its request bit, clears the KRQ_CP_HANDOFF bit, and counts the grant of the lock.
         (2) Return TRUE to indicate that we hold the lock. Do not execute the following steps:
      iii) Otherwise, spin waiting for either this quad's bit to be cleared from kp->kr_spin or for the KRQ_CP_HANDOFF but to be cleared from the kqp->krq_spin. When sampling the value of kp->kr_spin, save the value into "oldspin"
6) Since the previous step is an indefinite loop, this step is not reached.

Figure 8:
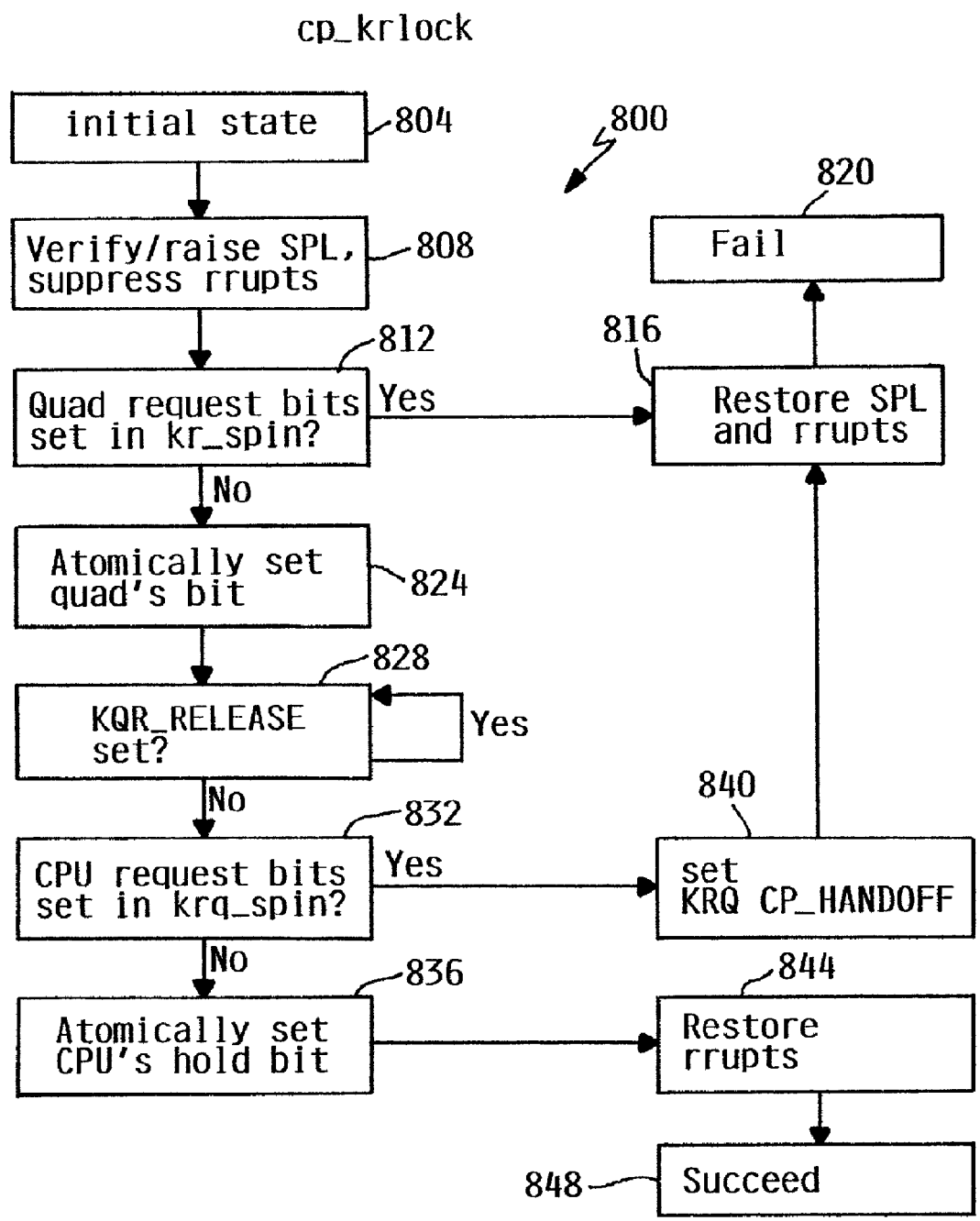
FIG. 8 is a flow chart of a conditional lock acquisition mode.

As mentioned earlier, in addition to the unconditional lock acquisition (p_krlock) procedure for acquiring a lock, there is also a procedure for conditionally acquiring the lock (cp_krlock). FIG. 8 is a flow chart (800) illustrating the general flow of control through the conditional acquisition. Following the initial state (804), the calling CPU requests the lock and the system priority levels is raised and system interrupts are suppressed (808). It must then be determined if the quad request bits for the lock are set in the global bitmask (kr_spin) field (812). If the quad request bit has already been set, then the requesting CPU will not acquire the lock. Both the SPL and system interrupts are restored (816), and a CPLOCKFAIL is returned (820) indicating a lock cannot be conditionally acquired by the requesting CPU. However, if at (812) it is determined that none of the quad request bits are set in the global bitmask (kr_spin) field, then the quad's request bit is atomically set (824). Next the CPU spins, waiting for the release flag of the per quad data structure (krq_spin) in the CPU holding the lock ro become cleared (828). The CPU request bit set in the spin state (krq_spin) must be checked (832) to determine if another CPU is requesting the lock. If there are no other CPUs holding the lock, the hold field is atomically set (336), the system interrupts are restored (844) and the CPU returns an indication that it has succeeded in acquiring the lock (848). However, if it is determined at (832) that another CPU is already requesting the lock, the handoff flag in the spin state of the per quad data structure (krq_spin) is set (840), the SPL and system interrupt levels is restored (816), and the CPU indicates that the conditional acquisition of the lock has failed (820).

The conditional lock acquisition method cp_krlock (800) acquires the specified lock if the lock can be acquired immediately. Otherwise, it neither acquires the lock nor raises the SPL, but instead returns a CPLOCKFAIL to indicate failure to the calling CPU. Since the kernel round robin locking primitive is designed for high contention, the conditional lock acquisition primitive cp_krlock (800) will almost always fail.

The pseudo-code is as follows:
1) Raise the SPL to "s", saving the old SPL in local variable "oldspl".
2) Suppress interrupts.
3) Atomically compare and exchange kp->kr_spin with 0, substituting "quadmask" on success. If the compare and exchange fails, do the following steps:
   a) Restore interrupts.
   b) Restore SPL to "oldspl".
   c) Return CPLOCKFAIL to indicate failure. Do not execute the following steps.
4) Otherwise, loop until the KRQ_RELEASE bit is cleared from the kqp->krq_spin. (Normally, this bit will be already cleared, so that the loop will not be executed.)
5) Atomically compare and exchange kqp->krq_spin with 0, using KRQ_ME2HOLDMASK. If the compare and exchange succeeds, do the following steps:
   a) Restore interrupts.
   b) Return "oldspl" to indicate success. Do not execute the following steps.
6) Otherwise, we have raced with an unconditional lock acquisition (p_krlock). Atomically add the handoff flag (KRQ_CP_HANDOFF) to kqp->krq_spin to hand the lock off to the racing CPU requesting an unconditional lock (p_krlock).
7) Restore interrupts.
8) Restore SPL to "oldspl".
9) Return CPLOCKFAIL to indicate failure.

Figure 7A:
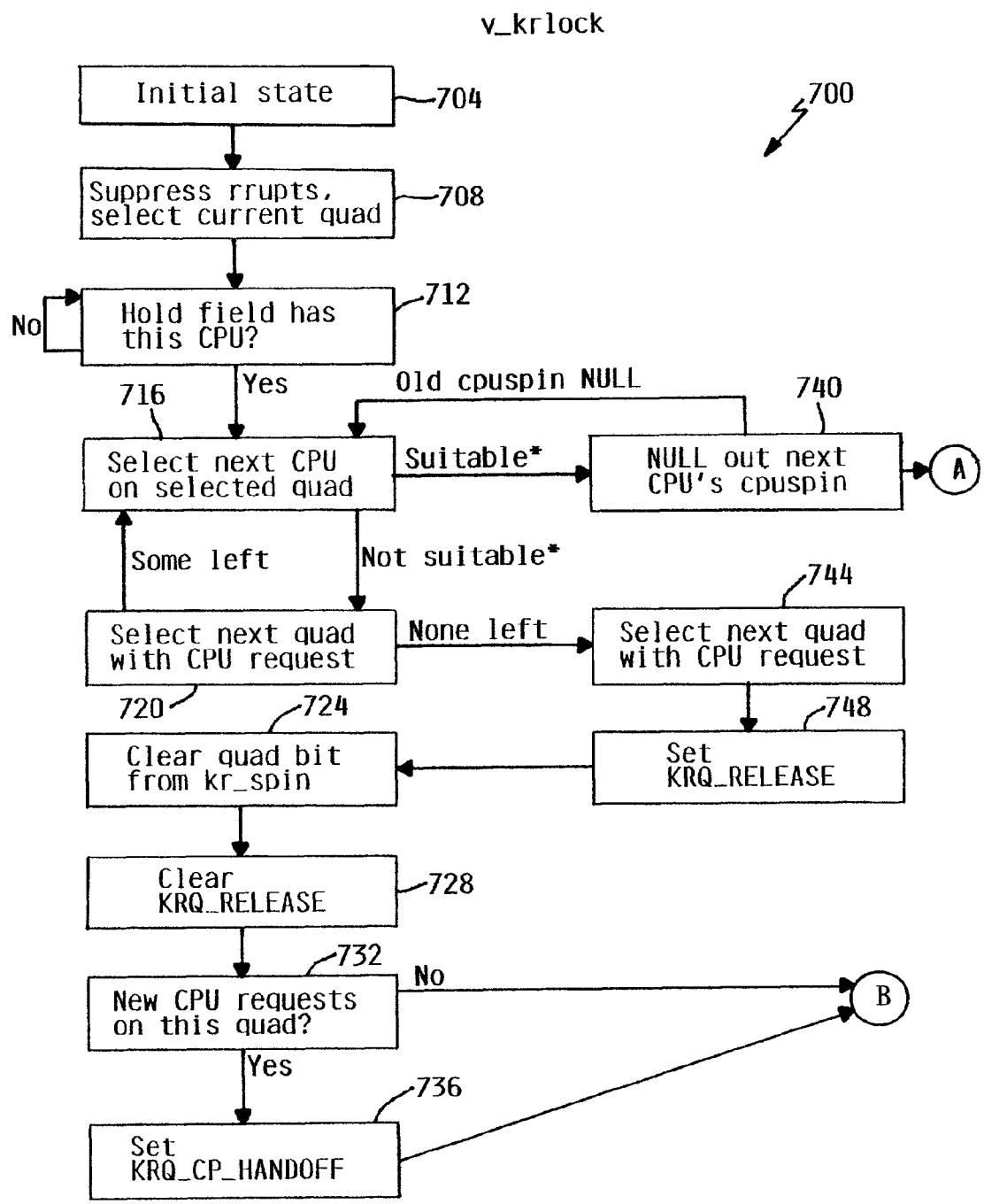
FIGS. 7A and 7B are a flow chart of a lock release mode.
Figure 7B:
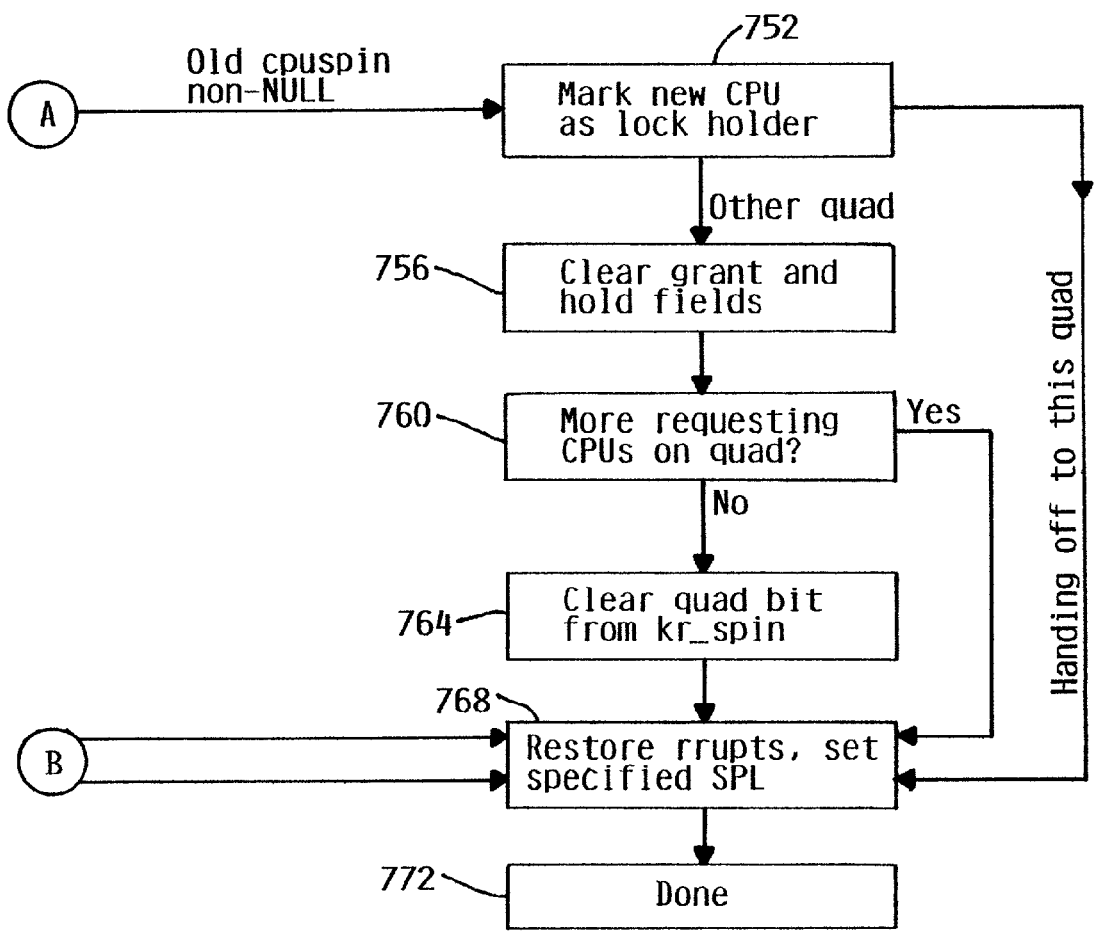

FIG. 7 refers to a flow diagram of a method v_krlock (700) for releasing a lock from a CPU holding the lock. The flow diagram illustrates the general flow of control throughout the operation. Following the initial state (704), the interrupts are suppressed because interrupts would cause problems with releasing a lock, and the SPL is raised, as shown at (708). In addition, the current quad wherein the lock is located is selected (208). Next, it is determined which CPU on the quad has the bit selected for the hold on the lock (712). Once the bit is selected, the next CPU on the selected quad is selected (716), regardless of which quad the CPU is located. Next, the CPU must determine if releasing the lock to the next CPU is suitable. The following criteria are indicative that the lock release is suitable:

1) If there is another CPU requesting the lock;
2) The release flag (KRQ_RELEASE) is not set, this is indicative that there is no previous lock release operation has not yet completed the release;
3) Either this quad has not exhausted its quota of consecutive grants, or no other quad contains a CPU requesting the lock; and
4) Either this per quad data structure (krq_spin) is for the same quad, or the hold field is clear.

If the hold field for a different quad is set, then this is indicative that a previous release procedure (v_krlock) has not fully completed. Accordingly, upon selecting a subsequent CPU to receive the lock, it must first be determined if the CPU is suitable for receiving the lock.

If it has been determined that the selected CPU is suitable for receiving the lock and the subsequent CPU in line to receive the lock must have cpuspin field set to NULL, this indicates that the subsequent CPU set to receive the lock was affected by a system interrupt (740). As such, the next CPU on the quad is selected to receive the lock (752). If the new CPU that has been marked as the lock holder is on the same quad as the previous CPU lock holder, then the system interrupts are restored and the specified SPL is set (768). However, if the handoff of the lock is to a CPU on another quad, the grant hold field, indicating the number of times the previous quad was granted a consecutive lock, is cleared (756). If there are more CPUs from the original CPU's quad (760), then the system interrupts are restored and the specified SPL is set (768). However, if there are not more CPU's on the former CPU lock holder's quad requesting the lock, then the quad bit in the global bitmask (kr_spin) is cleared (764), the system interrupts are restored, and the specified SPL is set (768). Accordingly, if the CPU requesting the lock was subject to a system interrupt subsequent to the selection of that CPU for receiving the lock, the release procedure selects the next CPU requesting the lock.

If at (716), it is determined that the selected CPU on the same quad is not suitable for receiving the lock, then the next quad holding a CPU lock request is selected (720). If there are no other CPUs on a different quad from the current lock holder requesting a lock, the current CPU lock holder's quad is selected (744), only if there are no requesting CPUs on the current quad. The release flag (KRQ_RELEASE) is set (748) for the CPU holding the lock. The quad bit from the global bitmask (kr_spin) is cleared (724), and the release flag (KRQ_RELEASE) is cleared. Otherwise if there are any new CPU requests for the lock on this same quad (732), then the handoff flag (KRQ_CP_HANDOFF) is set (736), and the system interrupts to the CPU releasing the lock is restored and the SPL is set (768). In addition, if there are no new CPUs on the same quad requesting the lock (732), the system interrupts to the CPU releasing the lock is restored and the SPL is set (768). Accordingly, the procedure for releasing the lock considers the location of the CPU requesting the lock so as to prevent starvation, i.e. keeping the lock within a single quad.

The pseudo code for the unconditional locking release primitive is as follows:
1) Suppress interrupts.
2) Invoke v_krlock_common(kp) to release the lock. (This function releases the specified lock, passing it on to the next requestor if there is one, or releasing the lock entirely if not.)
3) Restore interrupts.
4) Set the SPL to "s".

Pseudo-code for the function (v_krlock_common) used by v_krlock to release the lock to another CPU is as follows:
1) Set "oldspin" to kqp->krq_spin. Again, it may be desirable to invalidate the other CPU's caches.
2) If the hold field in "oldspin" does not indicate this CPU, a preceding v_krlock( ) operation has not yet fully completed. Loop until the hold field does indicate this CPU, reloading "oldspin" from kqp->krq_spin on each loop iteration.
3) Repeat the following steps indefinitely (each pass attempts to pass the lock off to a different quad):
   a) Invoke krlock_find_next (oldspin&KRQ_CPU_RQST_MASK, lastcpu), placing the result into "nextcpu". This function searches for the next CPU request to bit to hand off to, starting at the CPU indicated by "lastcpu".
   b) If each of the following conditions hold:
     i) krlock_find_necto found a CPU on this quad to hand off to, and
     ii) the KRQ_RELEASE flag is not set in "oldspin" (in other words, any preceding v_krlock( ) operation attempting to hand off to this quad has completed), and
     iii) either the number of consecutive grants to CPU's on this quad is still in range or the "firsttime" flag is not set, and
     iv) we are handing off to this CPUs quad, or the hold field in "oldspin" is clear (the hold field can be set if preceding v_krlock( ) has not fully completed) then attempt to hand off to the CPU indicated by "nextcpu" on this quad using the following steps:
     i) Locate the recipient CPU's spin location, and put a pointer to it into "cpuspin"
     ii) Atomically compare and exchange *cpuspin with "kqp", substituting NULL on success. If this operation fails, that means that the recipient CPU is not ready to accept the lock (perhaps the recipient CPU has not yet started spinning, or has just been interrupted). On failure, do the following:
       (1) Set lastcpu to nextcpu.
       (2) Place a new copy of kqp->krq_spin into "oldspin". Again, it may be desirable to invalidate the other CPU's caches.
       (3) Go back to the top of this loop (C "continue" statement).
     iii) Otherwise, the compare-and-exchange operation succeeded, and we have handed the lock off to the recipient CPU. We must now cleanup. This clean up work is one of the reasons that all the operations have the possibility of encountering a preceding v_krlock( ) operation that has not yet completed.
     iv) Set "newspin" to (KRQ_GRANT_INC+ KRQ_CPU2RQSTHOLD(nextpcu)- (oldspin&KRQ_CPU_HOLD_MASK). Atomically subtracting this will count this grant of the lock, clear the recipient CPU's request flag, and set the hold field to indicate that the recipient field now holds the lock.

v) If this quad has received more than its quota of consecutive grants, subtract (oldspin&KRQ_GRANT_MASK) from "newspin", thereby clearing out the grant field. This step cannot cause starvation, because the only way we can reach this step is if none of the other quads had CPUs requesting the lock (see above).

vi) Atomically add "newspin" to kqp->krq_spin to perform the required state update.

vii) If the recipient CPU is not on our quad, we must also clean up the state on our quad as follows:
  (1) Set kqp to point to the running CPU's quad's lock structure, using KRLOCK2KRLOCKPQ (kp,QUAD_NUM( )).
  (2) set "oldspin" to the value of kqp->krq_spin. Again, it may be desirable to invalidate the other CPU's caches.
  (3) Set "newspin" to oldspin&(KRQ_GRANT_MASKIKRQ_CPU-HOLD_MAS K).
  (4) Atomically subtract "newspin" from kqp->krq_spin into "oldspin". This atomic subtraction has the effect of clearing the grant and hold fields.
  (5) If "oldspin" indicates that no CPU's from this quad are requesting the lock, atomically subtract this quads bit from kp->kr_spin.
  (6) Return to the caller, do not execute the following steps:

b) Get here if it was not possible to hand off to a CPU on the currently selected quad. The following steps either release the lock entirely or find another quad to hand off to.

c) Put a copy of kp->kr_spin into "oldspin". Again, it may be desirable to invalidate the other CPU's caches.

d) If the only bit set in "oldspin" is the one for our quad, we may be able to completely release the lock as follows:
  i) Invoke v_krlock release(kp, KRLOCK2KRLOCKPQ(kp,QUAD_NUM( )), quadmask). If this returns TRUE, the lock was fully released, so we just return, and do not execute the following steps.
  ii) Put a copy of kp->kr_spin into "oldspin". Again, it may be desirable to invalidate the other CPU's caches.

e) Set "curquad" to the return value of krlock_find_next (oldspin,curquad).

f) Set "kqp" to the krlock_pq_t structure corresponding to "curquad"

g) Set "firsttime" to FALSE.

h) Set "oldspin" to kqp->krq_spin. Again, it may be desirable to invalidate the other CPU's caches.

i) Set "lastcpu" to "nextcpu"

4) Since the loop is indefinitely repeated, we do not reach this step.

Pseudo-code for the function (v_krlock-release) used by v_krlock_common to release the lock to another CPU is as follows:

1) Repeat the following steps indefinitely (or, more precisely, until we explicitly break out of the loop):
  a) Get a copy of kqp->krq_spin in "oldspin". Again, it may be desirable to invalidate the other CPUs' caches.
  b) If there is a requesting CPU, we raced with p_krlock( ). Return FALSE and let the caller sort it out.
  c) Atomically compare kqp->krq_spin with "oldspin", substituting KRQ_RELEASE on success. If the operation is successful, break out of the loop.

2) Atomically compare and exchange kp->kr_spin with "quadmask". Substituting zero on success. If the operation is unsuccessful, we raced with a p_krlock( ) or cp_krlock( ) on some other quad, and must reset our local krq_spin state as follows:
  a) Atomically add the quantity (oldspin-KRQ_RELEASE) to kqp->krq_spin, placing the old value of kqp->krq_spin into "newspin". This has the effect of backing out our setting of KRQ_RELEASE.
  b) If "newspin" had some requesting CPU's, then our backing out raced with a p_krlock( ) on this quad. We must hand the lock off to one of them as follows:
    i) Atomically add the quantity (KRQ_CP_HANDOFF-(oldspin&(KRQ_CPU_HOLD_ MASKIKRQ_CPU_GRANT_MAS K). This sets the handoff bit, which allows the first of the (possibly many) racing p_krlock( ) operations to proceed while simultaneously clearing out the hold mask and the count of consecutive grants. The letter is not strictly necessary, but is reasonable given that nobody wanted to lock for a brief instant.
    ii) Return TRUE to indicate that we no longer hold the lock. (We handed it off rather than releasing it, but who is counting? Either way, the caller does not have to mess with the lock any further.)
  c) Return FALSE to indicate that the caller must hand off the lock to one of the racing operations.

3) Get here if we successfully cleared out per-quad bit. Atomically subtract KRQ_RELEASE from kqp->krq_spin to complete the release operation.

4) Return TRUE to indicate that we fully released the lock.

Pseudo-code for the function (krlock_find_next) used above to find the next CPU to receive a handoff of the lock is as follows:

1) Set "mask" to have all the bits set corresponding to quads with higher numbers than "curquad", e.g to –(1<< (curquad+1)).

2) Set "maskresult" to contain bits set for all quads with higher numbers than "curquad" that also contain CPUs requesting the lock, e.g. to rqstmask&mask.

3) If "maskresult" is not equal to zero, return the number of the least-significant bit in "maskresult". This will be the number of the next quad to attempt to pass the lock off to. Do not execute the following steps.

4) Complement "mask". This will cause "mask" to have all bits set corresponding to quads with lower or equal numbers than "curquad".

5) Set "maskresult" to contain bits set for all quads with lower numbers than "curquad" that also contain CPUs requesting the lock, e.g. to rqstmask&mask.

6) If "maskresult" is not equal to zero, return the number of the least-significant bit in "maskresult". Again, this will be the number of the next quad to attempt to pass the lock off too. Do not execute the following steps.

7) Return KRQ_CPU_NONE to indicate that there are no more quads to hand off to. Due to the structure of the algorithm, this statement will never be executed. We always leave the current quad's bit set, so there is always at least one quad to attempt to pass on the lock to.

Pseudo-code for the function(krlock_rrupt_enter_ chk_common) to back out of a spin is as follows:

1) Atomically exchange the value pointed to by "csuspin" with NULL, placing the old value into "oldspin".
2) If "oldspin" is NULL, we have been granted the lock:
   a) Invoke v_krlock_common(kp) to release the lock.
   b) Return to the interrupt-entry code in order to progress through the interrupt handler without holding the lock. The interrupt-exit code will set us back up spinning on the lock.
3) Repeat the following steps indefinitely (each pass attempts to remove our request bit from the krq_spin mask).
   a) Set "oldspin" to kqp->krq_spin. Again, it may be advantageous to invalidate other CPU's copies of the cache line.
   b) If "oldspin" has the KRQ_RELEASE bit set, loop until the bit is cleared, and pick up a fresh copy of kqp->krq_spin. Normally, KRQ_RELEASE will not be set.
   c) Set "newspin" to oldspin-cpumask. This has the effect of clearing this CPU's request bit.
   d) Atomically compare and exchange kqp->krq_spin with "oldspin", substituting "newspin" on success. If the compare and exchange was successful, perform the following steps:
      i) If there are no more requesting CPUs on this quad, atomically, clear this quad's bit from kp->kr_spin
      ii) Return to the interrupt entry mode.

Pseudo-code for the function (krlock_rrupt_exit_chk_common) to restart a spin is as follows:
   I) Invoke p_krlock_nocontend (kp,kqp,cpumask) to reissue a request for the lock. If this primitive returns FALSE (indicating that we did not immediately get the lock).
      a) Atomically exchange "kqp" with the value pointed to by cpuspin, throwing away the old value pointed to by cpuspin.

As discussed above, when unconditionally releasing a lock, there are several races between contending CPUs that can occur when either releasing or handing off a lock. Both of these race conditions are resolved by the handoff flag (KRQ_CP_HANDOFF) and the release flag (KRQ_RELEASE) bits in the spin state (krq_spin) data structure. The handoff flag is set to control miscommunication between or among processors that can occur between a processor requesting a lock through a conditional lock acquisition and a processor requesting a lock through an unconditional lock acquisition. The release flag is set to prevent races that can occur between acquisition and release of the lock. The following example is illustrative of races for a lock that can occur among processors and/or CPUs and how the handoff flag resolves the races:

EXAMPLES

Example I

Assuming that there are four CPUs per quad, so that CPUs 0, 1, 2, and 3 are in quad 0, CPUs 4, 5, 6, and 7 are in quad 1, and so on, the following races may be eliminated by the handoff flag in line with the following hypothetical events:
1) CPU 0 executes a conditional lock acquisition primitive, which sets quad 0's bit in the global bitmask (kr_spin). Since no other bits are set in the global bitmask (kr_spin), CPU 0 can proceed to the quad level.
2) CPU 1 executes an unconditional lock acquisition primitive, which sets CPU 1 IS request bit in the quad 0 spin state data structure (krq_spin).
3) CPU 1 detects that it is the first CPU to set a request bit in the quad 0 spin state data structure (krq_spin), so it attempts to set quad O's bit in the global bitmask (kr_spin). It cannot do so, because CPU 0 has already set it.
4) CPU 2 also executes an unconditional lock acquisition primitive, which sets CPU 2's request bit in the quad 0 spin state data structure (krq_spin).
5) CPU 0 attempts to set CPU O's request bit in the quad 0 spin state data structure (krq_spin), but cannot do so because CPUs 1 and 2 have already done so. The implementation presented in this document has CPU 0 set the handoff flag, which would signal CPU 1 that it now holds the lock.

If there was no handoff flag, one of the following problems would arise, depending on other design choices:
1) Since no CPU other than CPU 0 can possibly acquire the lock one CPU 0 has set its quad bit in the global bitmask (kr_spin), one could simply have CPU 0 hand off to one of the other CPUs spinning on quad 0. The problem is determining which CPU to select. If CPU 0 selects CPU 2, then CPU 1 will be spinning at a high SPL, but spinning for a long time with interrupt disabled.
2) Have the conditional lock acquisition primitive clear the bit in the global bitmask (kr_spin). This results in a hang. If a CPU on some other quad has just set its bit in the global bitmask (kr_spin), then both that CPU and the CPU on this quad that beat out the conditional lock acquisition primitive would conclude that some other CPU held the lock, and both would wait forever for this mythical CPU to hand off to them.
3) Have the conditional lock acquisition primitive clear the global bitmask (kr_spin) bit only if there is no other bit set, and hand off to a CPU on the other quad if there is some other bit set. The problem here is that the CPU on the other quad that is to be handed off to might exit its critical section and try to hand off the lock to our quad before we get around to clearing our global bitmask (kr_spin) bit. This could once again result in the first CPU spinning at high SPL waiting to set it's quad's global bitmask (kr_spin) bit.

In addition to the handoff flag, there is also a release flag. The release flag is set to resolve races occurring between processors and/or CPUs during operation of a lock release and a lock acquisition. The underlying problem is that the unconditional lock release primitive clears out its global bitmask (kr_spin) bit before clearing out its per quad data structure (krq_spin) bits. This leads to a transient situation where CPUs on other quads can conclude that another CPU would be handing off the lock to them, which can lead to either hangs or multiple CPUs in the critical section simultaneously. The following example is illustrative of the need for the release flag:

Example II

1) CPU 0 executing an unconditional lock release sees no further requests for the lock, and therefore clears out all of quad 0's spin state data structure (krq_spin) bits.
2) CPU 4 executes an unconditional lock acquisition primitive on quad 1, setting its spin state in the per quad data structure (krq_spin) request bit in quad 1's spin state in the per quad data structure (krq_spin). CPU 4 sees that it is the first request on quad 1, and therefore sets its spin state data structure (kr_spin) bit. It sees that it is not first, because quad 0's bit is still set, so it settles down to spin.

3) CPU 1 executes an unconditional lock acquisition on quad 0, setting its spin state in the per quad data structure (krq_spin) request bit in quad 0's spin state in the per quad data structure (krq_spin) bitmask. CPU 0 also sees that it is the first request on quad 0, and therefore starts spinning waiting for quad 0's bit in global bitmask (kr_spin) to be cleared.

4) CPU 0 sees that quad 1 is global bitmask (kr_spin) bit it set, so that it cannot fully release the lock, but instead must hand it off. At this point, there are a couple of choices: (a) we can clear quad 0's global bitmask (kr_spin) bit, but then attempt to hand off to a CPU on quad 1, or (b) we can leave quad 0's global bitmask (kr_spin) bit set, and still hand off to a CPU on quad 1.

a) Suppose CPU 0 clears quad 0's global bitmask (kr_spin) bit before handing off to CPU 4. This can result in a race where both CPU 1 and CPU 4 believe they hold the lock:
  i) CPU clears quad 0's bit in it's global bitmask (kr_spin).
  ii) CPU 0 picks up a copy of quad 1's spin state data structure (krq_spin) field.
  iii) CPU 4 takes an interrupt, therefore clearing its request out of quad 1's spin state data structure (krq_spin) field and clearing quad 1's bit out of the global bitmask (kr_spin).
  iv) CPU 1 sets quad 0's global bitmask (kr_spin) bit, and sees that no other global bitmask (kr_spin) bit is set. CPU 1 therefore concludes that it hold the lock and enters its critical section.
  v) CPU 4 returns from its interrupt, and reinstates its request by setting its bit in quad 1's spin state data structure (krq_spin) field and setting quad 1's bit in global bitmask (kr_spin). Since quad 0's bit is already set in global bitmask (kr_spin), CPU 4 knows that it does not hold the lock, and therefore settles down to spin.
  vi) CPU 0 picks up at this point, unaware that CPU 1 holds the lock. CPU 0 therefore hands the lock off to CPU 4, so that both CPU 1 and CPU 4 are in the critical section at the same time.

b) Suppose CPU 0 leaves quad 0's global bitmask (kr_spin) bit set while handing off to CPU 4. Then we can have the following sequence of events:
  i) CPU 0 hands the lock off to CPU 4.
  ii) CPU 4 enters its critical section.
  iii) CPU 2 executes an unconditional lock acquisition and sets its request bit in quad 0's spin state data structure (krq_spin) field. CPU 2 sees that CPU 1 has already sets its spin state data structure (krq_spin) bit, so CPU 2 settles down to spin normally.
  iv) CPU 4 exits its critical section, and seeing that quad 0's global bitmask (kr_spin) bit is set, hands the lock off to CPU 2. CPU 2 then enters its critical section.
  v) Now, one of two things could happen. If CPU 0 clears quad 0's global bitmask (kr_spin) bit, then CPU 5 could execute a conditional lock acquisition method, and since there are no longer any bits set in the global bitmask (kr_spin), CPU 5 would think it had possession of the lock even though CPU 2 is still in its critical section. On the other hand, if CPU 0 simply leaves quad 0's global bitmask (kr_spin) bit set, then CPU 1 will be spinning for an extended period of time with interrupts disabled, which is bad for interrupt latency.

Accordingly, the above illustration of races pertaining to both the release and handoff flags are illustrations of the need for both of these flags in the preferred embodiment of the invention and how they function to ensure proper usage of the lock and prevent miscommunication between CPUs between lock acquisition and lock release.

Advantages Over the Prior Art

The kernel round robin locking primitive considers the hierarchy of the processors on the system. This allows the primitive to function on a large CC-NUMA system, as well as smaller systems. The primitive allows for both conditional and unconditional lock acquisitions, and allows for the processor releasing the lock to select the next processor to be granted the lock. Granting of the locks from one processor to a subsequent processor minimizes the number of interquad references. In addition, processors requesting a lock spin on private memory, thereby reducing the load on the local buses and increase performance both at low and high levels of contention compared to lingering locks.

Alternative Embodiments

It will be appreciated that, although specific embodiments of the invention have been described herein for purposes of illustration, various modifications may be made without departing from the spirit and scope of the invention. In particular, it will be understood by one of ordinary skill in the art that a blocking lock could be substituted for the spinlock used in the preferred embodiment. Further, while the preferred embodiment contemplates using interruptible locks which spin only on local (non-remote) memory, the invention requires only one or the other of those conditions, i.e. that either the lock spin only on local (non-remote) memory but be permitted to be non-interruptible, or that the lock be interruptible but be permitted to spin on remote memory. Accordingly, the scope of protection of this invention is limited only by the following claims and their equivalents.

We claim:

1. A computer system comprising:
  multiple processors;
  a lock selected from the group consisting of: an interruptible lock, and a lock which waits using only local memory; and
  a hierarchical representation of processor organization; and
  a lock primitive for processing the lock responsive to the hierarchy, wherein said primitive further comprises a handoff flag to grant a lock to a processor requesting an unconditional lock from a processor requesting a conditional lock.

2. The computer system of claim 1, wherein said primitive further comprises a conditional lock acquisition primitive.

3. The computer system of claim 2, wherein said conditional lock acquisition further indicates a lock failure if said lock is not immediately available.

4. The computer system of claim 1, wherein said primitive further comprises an unconditional lock acquisition primitive.

5. The computer system of claim 1, wherein said primitive further comprises a primitive for an unconditional release of said lock.

6. A computer system comprising:
  multiple processors;
  a lock selected from the group consisting of: an interruptible lock, and a lock which waits using only local memory;
  a hierarchical representation of processor organization; and a lock primitive for processing the lock responsive to the hierarchy, wherein said primitive further comprises a release flag to prevent races between acquisition and release of the lock.

7. The computer system of claim 6, wherein said primitive further comprises a conditional lock acquisition primitive.

8. The computer system of claim 7, wherein said conditional lock acquisition further indicates a lock failure if said lock is not immediately available.

9. The computer system of claim 6, wherein said primitive further comprises an unconditional lock acquisition primitive.

10. The computer system of claim 6, wherein said primitive further comprises a primitive for an unconditional release of said lock.

11. An article comprising:
a computer-readable signal bearing medium;
multiple processors;
means in the medium for hierarchically organizing at least some of the processors of a computer system;
means in the medium for providing a lock selected from the group consisting of: an interruptible lock, and a lock which waits using only local memory; and
means in the medium for processing the lock responsive to the hierarchy, wherein said means is a release flag responsive to races between acquisition and release of a lock.

12. The article of claim 11, wherein the means is a conditional lock acquisition primitive.

13. The article of claim 11, wherein the means is an unconditional lock acquisition primitive.

14. The article of claim 11, wherein a spin stage is entered by a processor if the lock is not immediately available.

15. The article of claim 11, wherein the means is an unconditional lock release primitive.

16. An article comprising:
a computer-readable signal bearing medium;
multiple processors;
means in the medium for hierarchically organizing at least some of the processors of a computer system;
means in the medium for providing a lock selected from the group consisting of: an interruptible lock, and a lock which waits using only local memory; and
means in the medium for processing the lock responsive to the hierarchy, wherein said means is a handoff flag responsive to a processor requesting an unconditional lock from a processor requesting a conditional lock.

17. The article of claim 16, wherein the means is a conditional lock acquisition primitive.

18. The article of claim 16, wherein the means is an unconditional lock acquisition primitive.

19. The article of claim 16, wherein a spin stage is entered by a processor if the lock is not immediately available.

20. The article of claim 16, wherein the means is an unconditional lock release primitive.

\* \* \* \* \*